United States Patent [19]

Pickering et al.

[11] 4,032,186
[45] June 28, 1977

[54] CONVERTIBLE TRUCK COVER

[76] Inventors: Phillip A. Pickering, 5823-177th Place Southwest, Lynnwood, Wash. 98036; Harold W. Pickering, 16727 Linden Ave. North, Seattle, Wash. 98133

[22] Filed: Dec. 17, 1975

[21] Appl. No.: 641,507

Related U.S. Application Data

[63] Continuation-in-part of Ser. No. 440,586, Feb. 2, 1974, abandoned.

[52] U.S. Cl. .............................................. 296/100
[51] Int. Cl.² ....................................... B60P 7/00
[58] Field of Search ............ 296/100, 98; 160/84 R; 135/1 A, 4 R; 105/377; 52/64, 66

[56] References Cited

UNITED STATES PATENTS

| | | | |
|---|---|---|---|
| 2,603,171 | 7/1952 | Smith | 52/66 |
| 2,817,344 | 12/1957 | Teeter | 296/100 |
| 3,298,732 | 1/1967 | Openshaw | 296/100 |
| 3,400,973 | 9/1968 | Heron | 296/100 |
| 3,418,752 | 12/1968 | Stratton | 160/84 R |
| 3,762,760 | 10/1973 | Tomson | 296/100 |

*Primary Examiner*—Robert R. Song

[57] ABSTRACT

A light weight convertible cover assembly for use on flat bed trucks, trailers and the like which enables the platforms to be used without any impediments to vertical loading during favorable weather and yet provides means for a rapid and easy protection from the weather in the event of inclemency. The cover assembly includes a stanchion or upright mounted at each corner of the load supporting platform. Opposing uprights at each end of the platform are interconnected by rigid horizontal members and the uprights diverge toward the top along the sides of the platform. Removable supporting cables interconnecting opposing uprights and extending along the sides of the platform support the flexible protective cover. A central support cable secured to the rigid horizontal member is provided parallel to the corner cables such that when the cover is extended over the load it has a three line stable support preventing sag or the like. Power means is provided to move a flexible cover from a collapsed condition adjacent one end of the platform adjacent one of the horizontal members to an extended condition whereat the entire load is covered.

8 Claims, 14 Drawing Figures

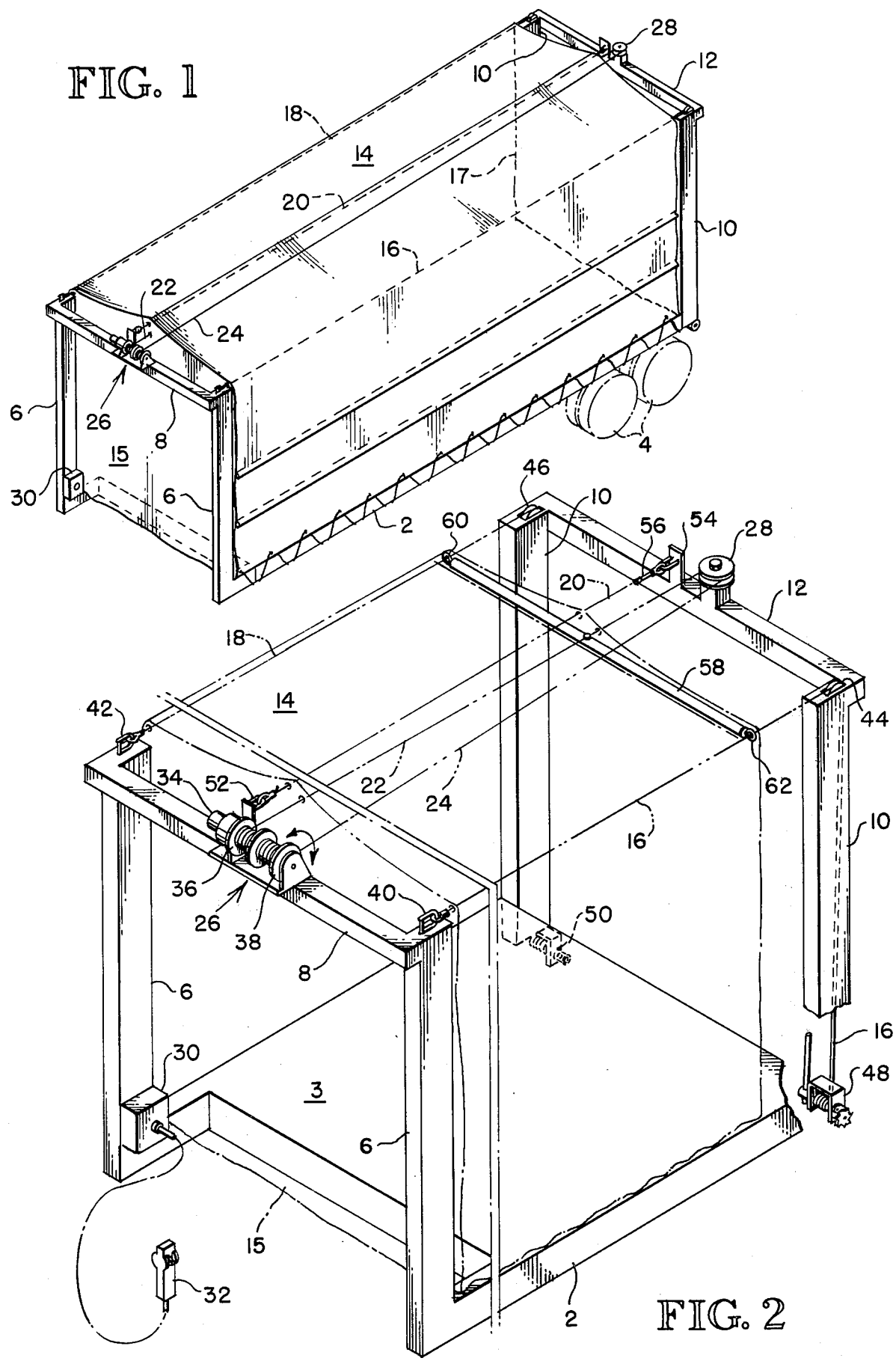

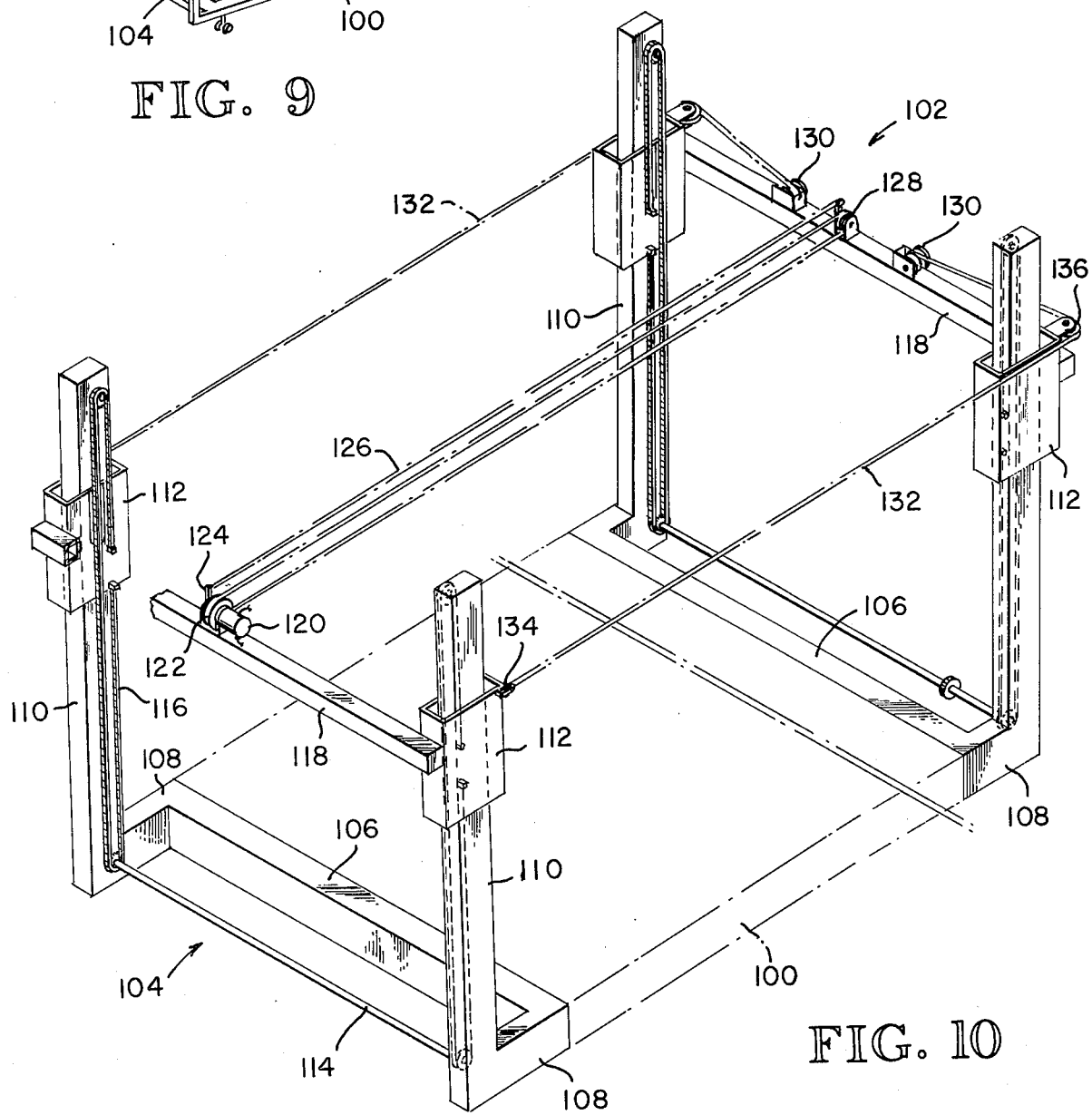

CONVERTIBLE TRUCK COVER

BACKGROUND OF THE INVENTION

This application is a continuation-in-part of U.S. patent application Ser. No. 440,586, filed Feb. 2, 1974, now abandoned.

It is well known that in order for a trucker to maximize his profit he must be able to load, unload and transport his cargo with a minimum of lost time. Often it is the simplest to transport cargo of a bulky nature on a flat bed truck or trailer. The utilization of this type of structure enables the load to be quickly and easily loaded or unloaded since there are no obstructions to impede the use of the standard load handling equipment. The use of flat supporting structure, however, has a distinct disadvantage in that it provides no weather protection. Another advantage of the flat bed structure lies in the fact that it has a larger pay load since it inherently weighs less.

In the event that weather protection is desired the individual or company concerned must provide a closed structure at greatly increased cost and decreased versatility. Another possibility of protecting the material from inclement weather lies in the well known utilization of a flat supporting platform in conjunction with portable tarping or the like. The disadvantage of portable tarping or alternate approaches of this nature lies in the fact that it normally takes a fair amount of man power and elapsed time to place and secure the tarp. If the product is perishable, the rain or other weather damage may be great. Another problem related to the tarping of cargo when referring to a flat bed truck or trailer exists in that the tarping is extremely difficult along the side of an expressway or the like with the winds and drafts caused by passing vehicles. It is also to be noted that tarping alongside a highway or other areas is extremely dangerous. A tarp of adequate size is heavy and the load is most often uneven, greatly increasing the chance of falling or straining the body.

A variety of attempts have been made in the past to provide a vehicle which has the advantage of not having a covering and thereby restrictive top structure and yet has the possibility of covering the load under adverse weather conditions. Many of the prior attempts at solving the problem have been quite similar to each other and utilize rigid side portions to support the top and to accommodate the inherent flexing of the platform during movement.

The prior art attempts are illustrated by several patented devices, for example, U.S. Pat. No. 2,807,499, granted Sept. 24, 1957 to Duddleston. This patent teaches the concept of an air operated cover mechanism for use in conjunction with a trailer having a rigid upstanding front and sides. U.S. Pat. No. 2,757,042, granted to Schultz, likewise teaches the concept of covering a trailer having rigid upstanding sides and utilizes the combination of a pulley and a canvas suspended to tight lines. The canvas is held in place and kept in proper tension by means of a track mechanism supported by the sides of the trailer. U.S. Pat. No. 3,041,104 granted to Richard likewise deals with a retractable cover having a plurality of bows to support the canvas and for mounting the operating mechanism. U.S. Pat. No. 3,138,399, granted to Hughes deals with yet another method of removably covering a vehicle such as a trailer and utilizes a plurality of ribs to hold the canvas in position over the top of the load on a vehicle having rigid upstanding sides. U.S. Pat. No. 3,168,345, granted to Roberts, et al., Feb. 2, 1965, deals with yet another type of convertible cover for use on a dump vehicle. The body of the vehicle has sides and the removable cover is more in the vein of an automobile convertible top having ribs pivoted about a hinge point along the sides of the vehicle whereby the cover may be simultaneously raised and pivoted forwardly to clear the top of the body. U.S. Pat. No. 3,179,464 granted Apr. 20, 1965 to McBurney, et al., has a pair of relatively fixed track members upon which the sides of a canvas are channeled by means of guides and ribs. U.S. Pat. No. 3,298,732 granted Jan. 7, 1967 to Openshaw, deals with yet another concept of covering a trailer having rigid sides with an open top and includes a plurality of ribs which are moved back and forth across the top of the trailer, the ribs extend down along the sides of the trailer and the canvas is supported by the ribs which are secured to the sides. U.S. Pat. No. 3,400,973, granted Sept. 10, 1968 to Herou deals with yet another type of superstructure for vehicles wherein the rigid sides of the vehicle provide a base point for supporting ribs which actually carry the canvas. U.S. Pat. No. 3,433,470, granted to Erke on Mar. 18, 1969 discloses a double walled inflatable cover for use upon a flat bed vehicle and provides both sidewall and roof construction. This structure requires a utilization of roof bows and an end frame the combination of which support the inflatable wall and ceiling structure.

Other pertinent teachings noted during the prosecution of the above-mentioned copending case include U.S. Pat. No. 2,603,171, granted to Smith on July 17, 1952, disclosing a flexible convertible cover for a building utilizing rigid support members and truck serving as girdle members, U.S. Pat. No. 2,817,344, granted to Tecter on Dec. 24, 1957 disclosing a convertible garage cover utilizing stiff ribs and trucks, U.S. Pat. No. 3,418,752, granted to Stratton on Dec. 31, 1968 disclosing a removable cover for bedding plants, U.S. Pat. No. 3,447,830 granted to Willison on June 3, 1969 disclosing: an expandable canopy for pickup trucks and U.S. Pat. No. 3,482,716 granted to Leadley on Dec. 9, 1969 disclosing a vehicle with an expandable body.

The first three references referred to in the preceding paragraph deal with structures which are fixed and therefore not subjected to the requirements of light weight, limited size and relative movement of the various supporting actuating elements. The last two references referred to in the preceding paragraph deal with rigid structures utilized upon mobile framework which add both weight and rigidity to the structure.

With the above noted prior art attempts in mind it is an object of the present invention to provide a convertible cover for use on flat bed trucks, trailers or the like wherein the operator may quickly and easily cover material supported by the platform without impeding either the loading and/or unloading or reducing the load carrying capacity.

It is another object of the present invention to provide a convertible cover for the use upon a flat platform or the like wherein the entire sides and top of the platform may be quickly and easily freed of all obstructions permitting loading by fork lift, over head crane or the like.

It is another object of the present invention to provide a convertible cover for a flat bed trailer or the like which is light of weight, quickly and easily operated and wherein the cost of material is kept to a minimum.

A more particular object of the invention is to provide a convertible cover for a flat bed trailer which requires only slight modification to the standard purchased trailer. An inverted U-shaped upright is secured to the forward end and to the rearward end of the trailer with the upper ends slightly diverging, a pair of supporing cables extend from each front corner to the rear corner for retaining the canvas at its proper position, and a center cable is provided at a slightly increased elevation from the corner cables thus supporting the center of the canvas and forming a tent-like roof structure. A driven drum or pulley is provided to expand or contract the canvas cover.

Still another object of the present invention is to provide a convertible cover for use upon a flat bed trailer or the like wherein the effective height of the cover may be varied to accommodate different sized loads.

Still another object of the present invention is to provide means within the control of a single individual to cover a large area with a weather-proof material and the structure does not involve a great deal of framework or the like to restrict the usage of the space.

A still further object is to provide a convertible cover mechanism for use upon a flat bed trailer or the like wherein the mechanism is sufficiently light weight to not impede the load capacity and flexible such that the normal twisting and bending of the trailer does not effect the structure or its operation.

BRIEF DESCRIPTION OF DRAWINGS

FIG. 1 is an illustrative view of the inventive cover as mounted to a flat bed truck trailer.

FIG. 2 is an enlarged section of FIG. 1 showing the cover in a partly expended condition and more clearly illustrating the supporting and driving mechanism.

FIG. 7 is a perspective view of a trailer of the type suited for use with the present invention with the vertical supports in place, the cables removed for ease in loading and the inherent bow of the trailer emphasized.

FIG. 8 is a perspective view of the trailer of FIG. 7 with a load in place.

FIG. 9 is a perspective view of the trailer of FIG. 7 with a load in place and the cables in position.

FIG. 10 is a partial perspective view of a trailer utilizing the present invention and depicting yet another method of adjusting the height of the support cables.

DETAILED DESCRIPTION OF THE DRAWINGS

Figure 3:
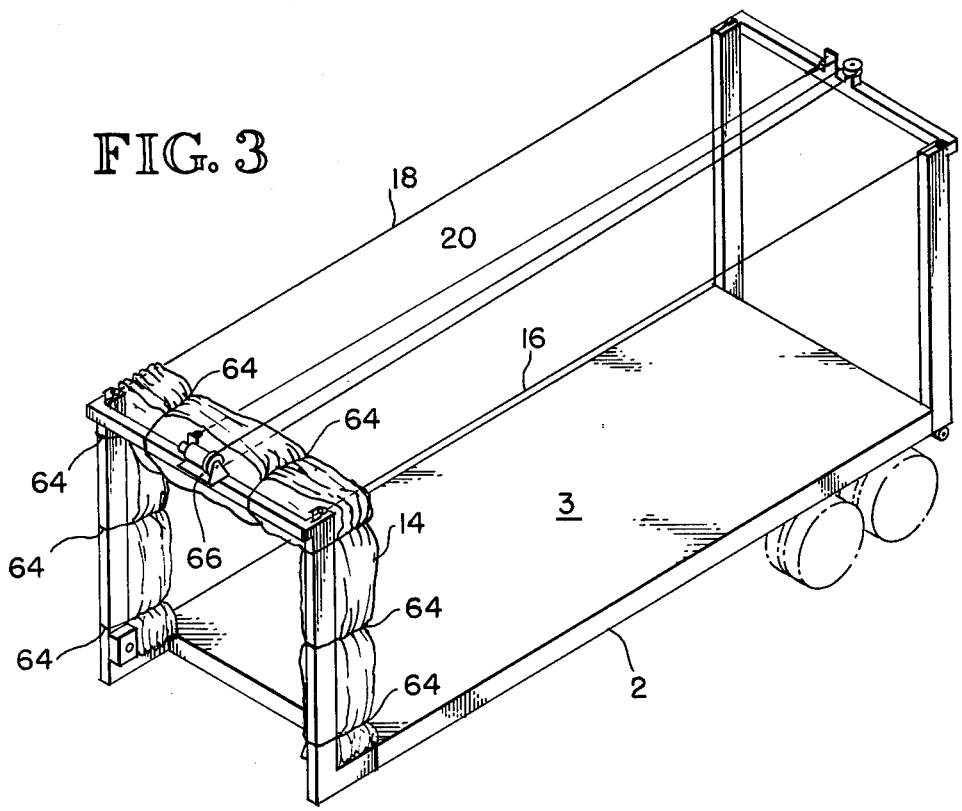
FIG. 3 is a view of the cover in its collapsed condition with an alternative drive method.

As seen in FIG. 1 the preferred embodiment of the invention is disclosed upon a flat bed trailer including a supporting framework and load supporting platform 2 which in turn are supported by wheels 4. An inverted U-shaped substantially vertical upright including a pair of leg members 6 and a linking cross piece 8 are provided at the front end of the trailer. At the after end of the trailer a similar upright of members 10 and cross piece 12 is provided. These inverted U-shaped uprights form the base for the retractable cover as described hereinafter.

A convertible retractable cover in the form of a canvas 14, having a front closure 15 and a rear closure 17, as seen in this view, extends from the forward upright to the rearward upright and is supported by means of horizontal cables 16 and 18 under the corners of the canvas and a central supporting cable 20.

The cover is moved from its expanded to contracted position and vice versa by means of in haul and out haul interconnected cables 22 and 24. The cables 22 and 24 are reeled in and out by means of winch 26, mounted to horizontal member 8, and extend to the rear of the trailer where they are threaded through pulley 28, secured to horizontal member 12. The control for the winch 26 is mounted at the lower end of upright 6 for convenience and with a removable control mechanismthe operator may cover his load from the side of the vehicle.

Attention is now directed to FIG. 2 wherein the individual elements of the structure can be seen more clearly. The uprights 6 are welded or otherwise secured to the basic framework 2 of the trailer and extend forwardly thereof to allow room for the cover when it is collapsed without reducing the space available for carrying a load. Mounted upon one of the uprights 6 is the control 30 having an interconnection for remote control 32 whereby the operator may stand away from the trailer and observe the operation of the mechanism. The location of the driver during operation is determined for safety and for reducing the probability of damage to the equipment. The horizontal member 8 secured to the forward uprights extend even further forward of the front of the trailer providing greater room for the collapsed cover away from the bed and also to provide room for the double drummed winch 26. As seen in this view the winch 26 includes a motor 34, a first drum 36 for out haul of the cable secured to the cover and thus controlling movement thereof and a second drum 38 for in haul of the canvas cover.

A pair of supporting cables 16 and 18 extend from fixed points 40 and 42 on the forward upright to pulleys 44 and 46 on the rear upright and thence downwardly to winches 48 and 50. The tension upon the cables 16 and 18 may be varied as desired by use of winches 48 and 50 and further if desired, the cables may be released and completely removed for ease of loading and unloading the trailer.

Extending from a fixed position slightly elevated from the horizontal bar 8 the center cable 20 extends to an elevated position 54 on the horizontal bar 12 at the rear upright and is kept at the tension sufficient to support the cover by means of a turn buckle 56.

As can be seen, the utilization of cable 20 and vertical risers 52 and 54, the collapsible canvas 14 is retained at a position slightly higher in the center thereby providing clearance for the cables 22 and 24 to move backwardly and forwardly without interferring with the canvas itself. This configuration also provides a slightly downwardly sloping upper surface inducing rain, snow and the like to roll off of the vehicle rather than stay and cause the canvas to sag. A rigid horizontal bar 58 extends through a pocket in the canvas 14 and includes a pair of loops 60 and 62 which ride on cables 16 and 18, respectively causing the canvas to move backwardly and forwardly in a uniform manner and along a prescribed path.

Reference is now had to FIG. 3 wherein the flexible cover 14 is shown in its collapsed condition. It may be readily seen that the forward placement of the forward upright allows the cover 14, when in its collapsed condition, to essentially be removed from any of the usable upper surface 3 of the flat bed trailer. A plurality of tie-down straps are utilized to hold the canvas away from the usable area when the cover is in the collapsed or retracted condition. When it is desired to remove the cables 16, 18 and 20, as well as the operating cables for purposes of being able to load the trailer from the top, the tie-downs 64 will hold the canvas in its collapsed condition adjacent the forward upright ready to be again utilized after replacement of the support cables.

As seen in FIG. 3, the mechanism utilizes a motorized pulley. The means for moving the canvas from its collapsed to its expanded condition and vice versa is a closed loop of fixed length which is driven by a motorized pulley 66 and extends over a freely rotating pulley at the opposite end of the platform. The motorized pulley may include a serated interior surface for increased friction with the flexible control element secured to the canvas, thus assuring positive response.

Figure 4:
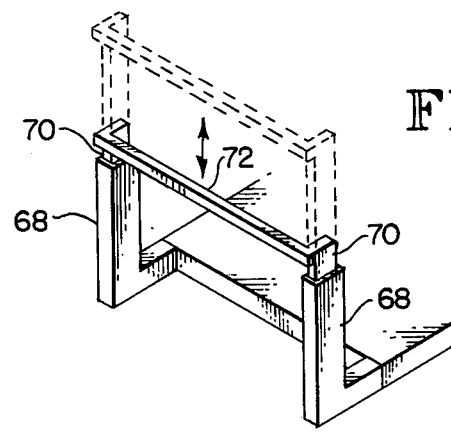
FIG. 4 is a view of one method of providing an alternative height for the cover itself.
Figure 5:
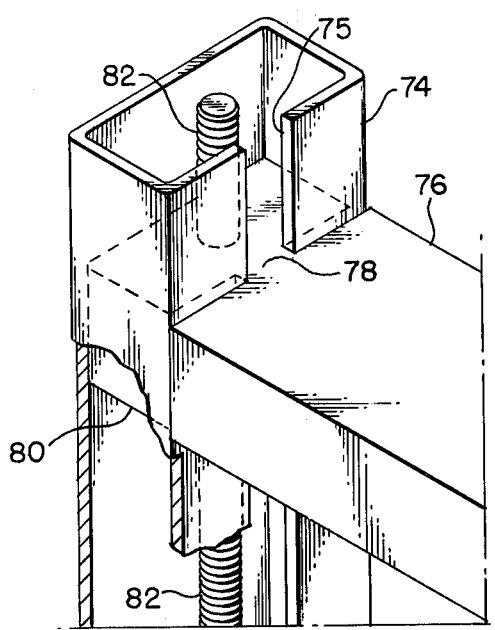
FIG. 5 is a second method of varying the height of the tarp covering.
Figure 6:
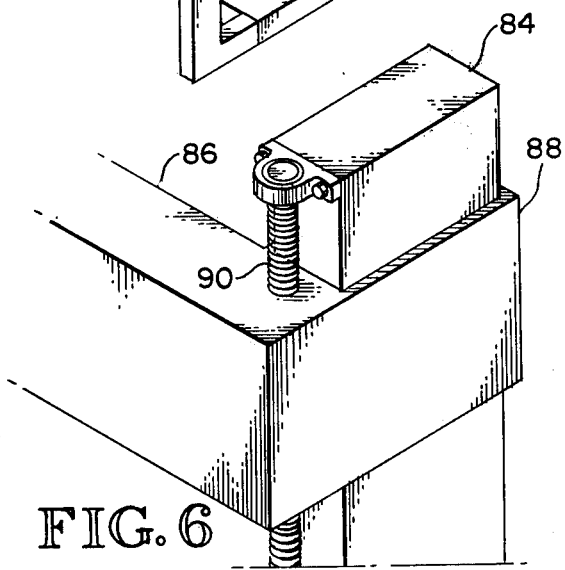
FIG. 6 is yet another method of varying the height of the covering material.

Attention is now directed to FIGS. 4, 5 and 6 which disclose three alternative methods of raising and lowering the uprights and attached horizontal cross member or alternatively raising and lowering the horizontal cross bars relative to the uprights thereby controlling the height at which the canvas is maintained during travel. As seen in FIG. 4 the upright consists of a first hollow vertical member 70 which carries the cross bar 72. Although not shown it is to be understood that the upright 70 and cross bar 72 would carry the same or similar mechanism as was shown and described with respect to FIGS. 1 and 3. The raising and lowering of interior telescopic member 70 will be done by a jack screw or any other convenient source of power.

FIG. 5 utilizes a second method of raising and lowering the effective height of the cross member. In this particular case the vertical upright 74 is in the form of a rectangular hollow beam with a longitudinal slot. The resultant structure is in effect a C-configuration when viewed in cross section. The cross bar 76 which supports the driving mechanism, as well as the rigid fixed elements holding the supporting cables, includes at its outer most ends a shape which is telescopically received within the hollow member 74. The outer ends of bar 76 include a neck 78 which fits within the slot 75 in the beam 74. The cross bar 76 retains its normal exterior dimensions at its ends forming a head portion 80 such that the head 80 of the beam 76 is captured within the upright 74. The cross bar 76 is moved upwardly or downwardly by means of jack screw 82 or the like. It is to be understood that although FIG. 5 illustrates only one end of the upright the opposite end would be identical and the jack screws would be operated in tandem such that the crosspiece 76 would move smoothly upwardly and downwardly as desired while maintaining the cross bar in a horizontal orientation.

Still another means for effectively varying the height of the cover is shown in FIG. 6 wherein the vertical upright 84 is also of a hollow configuration. The cross bar 86 includes a vertical sleeve-like member 88 at its opposite ends such that the sleeves 88 will smoothly fit over the uprights 84. By use of a jack screw or hydraulic means the cross bar 86 may be moved upwardly or downwardly while the sleeve 88 slips on the upright 84.

With greater emphasis now being had on the necessary mobility and particular attractiveness of the invention with respect to a truck, trailer or the like, reference is had to FIGS. 7, 8 and 9, wherein in FIG. 7 the empty trailer is shown with the inventive mechanism attached thereto. As can be seen in this view, the trailer bed 100 has a definite bow which is emphasized for clarity. Also to be noted in this view is that the uprights 102 and 104 upon which the drive mechanisms are secured diverge towards the top.

As can be seen now in FIG. 8, a load of the type which could not possibly be placed on a trailer having restrictive cover supporting structure has been placed on the trailer causing the bow in the trailer bed 100 to even out and the uprights to move to an approximately vertical position.

As seen in FIG. 9, the cover supporting cables, as will be described in greater detail hereinafter, have been placed in proper position to support the load and protect the canvas which has been removed for clarity.

Referring now to FIG. 10 the bed of the trailer 100 again, as noted above, is shown as having a slight bow or hump which is the standard manufacturing procedure. Secured to either end of the bed 100 is the cover supporting upright mechanisms 102 and 104 which in this particular embodiment include a structural unit having a horizontal member 106 secured to the end of the trailer and having horizontally extending elements 108 at its upright ends. The uprights themselves 110 are secured to the horizontal elements 108 and extend upwardly at a slight angle from the vertical such that they are slightly wider at the top when viewed along the length of the trailer than they are at the bottom. As explained hereinabove, the reason for the slight divergence of the uprights is such that the load upon the trailer which tends to lessen the bow inherent in the trailer causes the uprights to approach a vertical position and then when the supporting cables are in and under tension the entire mechanism acts together as a unit without unacceptable slop. Secured to each of the uprights 119 is a shortened sleeve element 112 to be described in greater detail hereinafter. Sleeves 112 are vertically movable along the uprights 110 and controlled by a common drive shaft 114 and drive chain 116 which are secured to the interior surface of uprights 110. Horizontal elements 118 are secured to the sleeves 112 and serve as support for the drive motor 120, the motorized pulley 122, the central upright 124 which serves as an anchor for the center cable 126, as well as the rear free-wheeling pulley 128 and the tension control mechanisms 130 for the corner cables 132. Also secured to sleeves 112 are the anchoring points 134 for the corner cables 132 and pulley mechanisms 136 which guide the cable 132 and allow the tension to be easily adjusted. It is to be understood that cables 126 and 132 are all secured by quick disconnect mechanisms, not shown, so they may be quickly and easily removed for loading and unloading the trailer itself.

Figure 11:
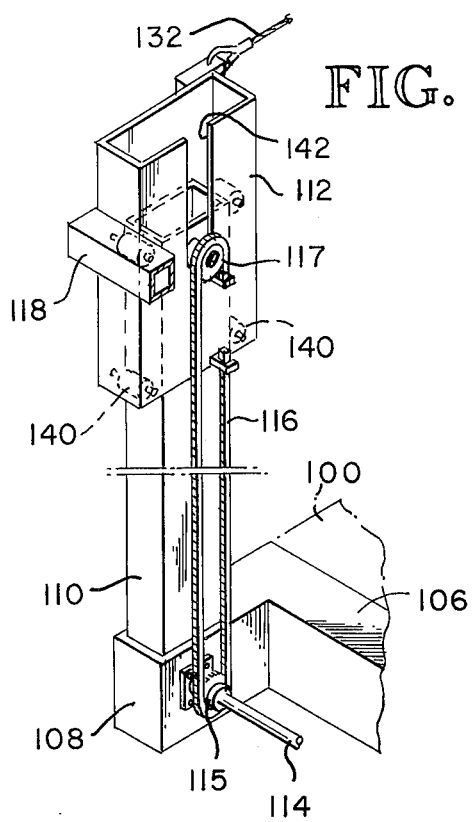
FIG. 11 is an enlarged view of the front corner of the structure of FIG. 10.

Referring now to FIG. 11 the vertical adjusting mechanism can more readily be seen. As seen in this view, the drive shaft 114 drives sprocket 115 which in turn controls chain 116 which is fed over sprocket 117. The ends of the chain 116 are secured to the sleeve 112 such that when the chain moves in either direction it controls the vertical position of sleeve 112. Sleeve 112 is mounted to upright 110 and held in proper vertical relationship therewith by means of rollers 140 which are mounted within the sleeve 112. As best seen in this view the sleeve 112 includes therein a horizontal slot 142 which as seen in this view allows the sleeve 112 to be moved to a position whereat the top surface, i.e., the surface which supports the corner cables 132, actually extend above the top of the upright 110. Since for maximum utilization of the trailer space the vertical 110 will be of the maximum height allowed by law, the ability to move the sleeve 112 to that position shown in FIG. 11 permits the cables 132 to be in a position less likely to impede loading or unloading by a fork lift or the like. It is further to be noted at this point that since the horizontal support members for the convertible cover are of a flexible structure they can in fact be bumped by the boom of a fork lift or the like without danger of permanent or critical damage. As noted hereinabove the cable 132 is secured to the sleeve by means of a quick disconnect which is not a part of the present invention and therefore not shown.

Figure 12:
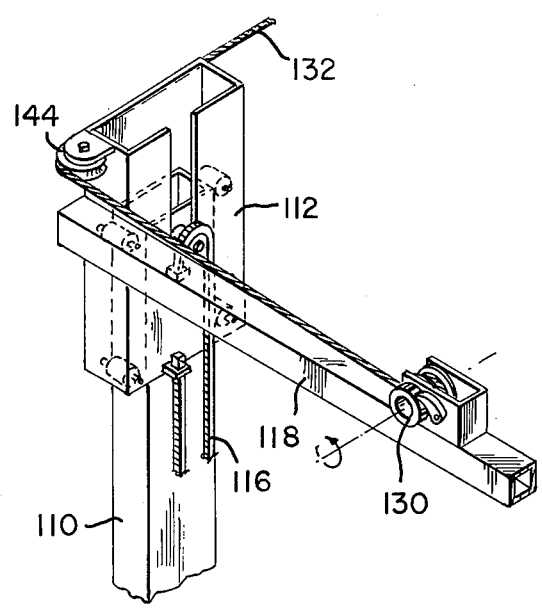
FIG. 12 is an enlarged view of the rear corner of the structure of FIG. 10.

Reference is now had to FIG. 12 wherein the rear mechanism is shown and it is available it is very similar to the mechanism described in FIG. 11 which was the front mechanism with the exception of the fact that the sleeve 112 also includes a horizontally disposed pulley mechanism 144 which serves as a guide for the cable element 132 and the horizontal member 118 as noted above includes the cable adjusting mechanism 130. As shown in this view the cable adjusting mechanism is a simple ratchet type spool wherein a crank or the like can be used to adjust the tension.

Figure 13:
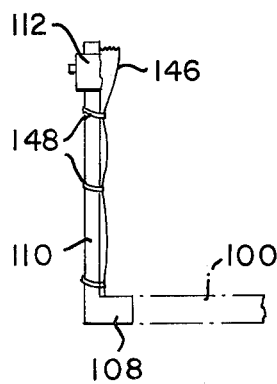
FIG. 13 is a side view showing the cover retracted.

Referring now to FIG. 13 it can readily be seen that the truck or trailer bed 100 is left completely free for loading or unloading when the canvas cover 146 is retracted against the front mechanism and secured in position by means of tie down straps 148.

Figure 14:
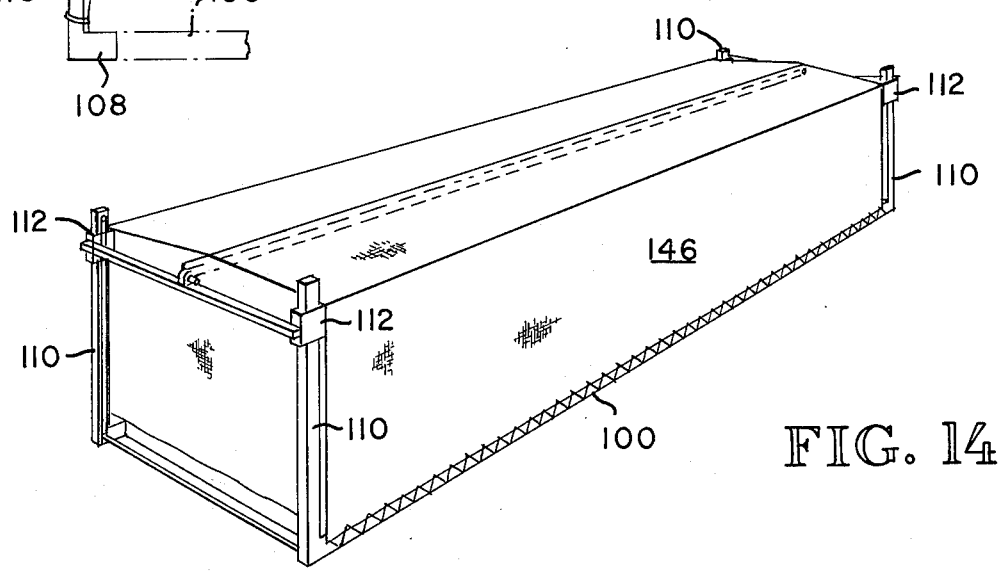
FIG. 14 is a perspective view of the structure with the cover in place.

The canvas in its extended or protective position is shown in FIG. 14 and it can be seen that the canvas offers substantially protection from the elements for the entire trailer surface and yet because of its particular construction the inventive mechanism does neither add substantial weight to the trailer nor does it suffer from the problem of continual breakage due to stress caused by the flexure of the trailer.

As can be seen, the present invention provides a novel, unique and much needed mechanism for protecting loads mounted upon a trailer. As will be readily recognized by those familiar with the art the carriers have tended to utilize trailers of the maximum size allowable by law, including height, width and length. As these trailers have greatly increased in size over the years the manufacturers have also been restricted by the fact that the state laws, to protect their highways, have placed load maximum requirements upon the trailer. Therefore the manufacturer and/or user is required to make sure that his load and/or trailer are within the prescribed limits of size and weight and yet to gain the maximum return for his investment he must carry as large a load as possible without damage to the merchandise. Thus, as can be seen the trailer manufacturer will produce a trailer which is of light weight and yet sufficient strength. It has been found that in order to do this on a larger size trailer there is an inherent amount of flexure during utilization. The present invention complements these somewhat contradictory desires in that it offers a ready protection for the merchandise carried and yet does not offer a substantial amount of weight increase. Further as pointed out hereinabove, any covering structure which is not of sufficient strength to make the entire trailer a rigid body will fail during the flexure and the present invention accommodates the flexure without danger of damage.

What is claimed is:

1. A cover means for a trailer or the like having a load supporting platform which flexes during normal use including necessary supporting framework comprising:
   a. rigid upright members secured to the framework at opposite ends of the platform leaving the remainder of the platform free from obstruction, said upright members including vertically oriented elements adjacent the corners of the platform and at least one substantially horizontal element extending between the vertical elements substantially parallel to the end of the load supporting platform,
   b. flexible removable support means yieldable to the flexing of said platform extending from one upright to the other along each side of the platform said support means providing the sole side support for a cover, means for releasably securing said flexible support means to said uprights,
   c. flexible cover means of a size capable of substantially covering the load supporting platform, said cover means resting on top of the flexible support means and extending therebetween over the top of the platform, and
   d. means for moving the cover means from a contracted position adjacent one of the upright members, uncovering substantially the entire platform to an expanded position overlying the area between the upright members.

2. A cover means as in claim 1 wherein the rigid upright members are mounted so they diverge away from the platform permitting the flexible support means to be placed under tension without causing the uprights to move inwardly from the vertical.

3. A convertible cover means as in claim 1 wherein the means to move the cover includes a flexible element forming a closed loop, secured to the cover means and driven by a reversible motorized pulley.

4. A convertible cover for use on a mobile load supporting platform which flexes during normal use comprising:
   a. rigid retangular substantially obstruction free platform means having a first pair of rigid upright members secured to the platform means at the extremes of a first edge and a second pair of rigid upright members secured to the platform means at the extremes of a second edge substantially parallel to the first edge, leaving the remainder of the platform free for side loading,
   b. a pair of rigid cross-members spaced from the platform, extending between and secured to each of said first and second pair of rigid uprights,
   c. a pair of substantially parallel, flexible removable support members yieldable to the flexing of said platform spaced from the platform, and extending between the rigid upright members and extending along opposite edges of the platform and providing the sole edge support for a cover means, means for releasably securing said flexible support members to said rigid, upright members, d. flexible cover means movable from a collapsed condition adjacent a first pair of rigid uprights uncovering substantially the entire platform to an extended position covering the platform and supported by the parallel flexible support means, and e. means for removing the cover from an extended condition to a collapsed condition whereby the platform may be easily loaded from either the top or the sides upon collapse of the cover and removal of a flexible support members.

5. A convertible cover as in claim 4 and further including means to retain the cover means adjacent the cross members and the rigid upright members when the flexible support members are removed.

6. A convertible cover means as in claim 4 and further including a third flexible removable support means substantially parallel to the pair of flexible support means, located between the two and slightly above a plane passing through the pair such that the cover means has a slight longitudinal peak when extended.

7. A convertible cover means as in claim 4 wherein the rigid cross members are vertically movable along the rigid uprights and the flexible support members are secured to the rigid cross members and move therewith.

8. A convertible cover means as in claim 7 wherein the rigid cross members are secured to the uprights by means of sleeves at each end telescopically receiving the uprights and said sleeves are simultaneously driven to raise and lower the uprights and the attached supporting structure.

* * * * *